March 24, 1953

C. B. LIVERS ET AL
FLUID-METERING VALVE FOR HYDRAULIC
MOTOR CONTROL SYSTEMS
Filed Sept. 25, 1950

2,632,470

INVENTORS
C. B. LIVERS
A. A. MEDDOCK

BY  *T. B. Woodbury*
ATTORNEY

Patented Mar. 24, 1953

2,632,470

UNITED STATES PATENT OFFICE 2,632,470

FLUID-METERING VALVE FOR HYDRAULIC MOTOR CONTROL SYSTEMS

Carlos B. Livers, North Hollywood, and Alvin A. Meddock, Van Nuys, Calif., assignors to Bendix Aviation Corporation, South Bend, Ind., a corporation of Delaware Application September 25, 1950, Serial No. 186,664

8 Claims. (Cl. 137—620)

This invention relates to shut-off valves for hydraulic motors for automatically stopping such motors when they have been actuated through a predetermined distance, and particularly to valves for such purposes that respond directly to the quantity of fluid flowing through the motor as distinct from those that are mechanically actuated by the motor.

An object of the invention is to provide a practicable automatic valve that can be inserted at any point in one of the lines between a hydraulic motor and the usual manual control valve therefor, and that will limit the range of movement or stroke of the motor in one direction to a definite predetermined distance without limiting its operation in the other direction.

Another object is to provide an automatic valve of the type referred to that blocks the line after a predetermined amount of fluid has passed through it in one direction, but is quickly reset by momentary reversal of fluid flow, to again permit the predetermined amount of fluid to flow in the one direction, so that a motor in series with the valve can be moved either a predetermined distance or a multiple of that distance.

Another object is to provide a valve for blocking a line after a predetermined quantity of fluid has flowed therethrough, which valve is relatively accurate and yet simple and inexpensive.

Other more specific objects and features of the invention will appear from the description to follow.

Briefly, the automatic valve in accordance with the invention comprises a reciprocable valve movable between two limits by a small piston and blocking fluid flow in one limit position. The piston is moved through its stroke at a speed proportional to the rate of fluid flow through the line in which the valve is inserted, but slower in the closing direction of the valve than in the opening direction. This is accomplished by directing the entire flow against the piston during movement in the opening direction, and by limiting the flow from the piston to a definite fraction of the total flow during closing movement of the piston. Limitation of the flow from a fraction of the total flow is obtained in accordance with the invention by means of a small motor connected in the line and mechanically coupled to a smaller pump that meters the fluid displaced by the piston.

A full understanding of the invention may be had from the following detailed description with reference to the drawing, in which.

Figure 1:
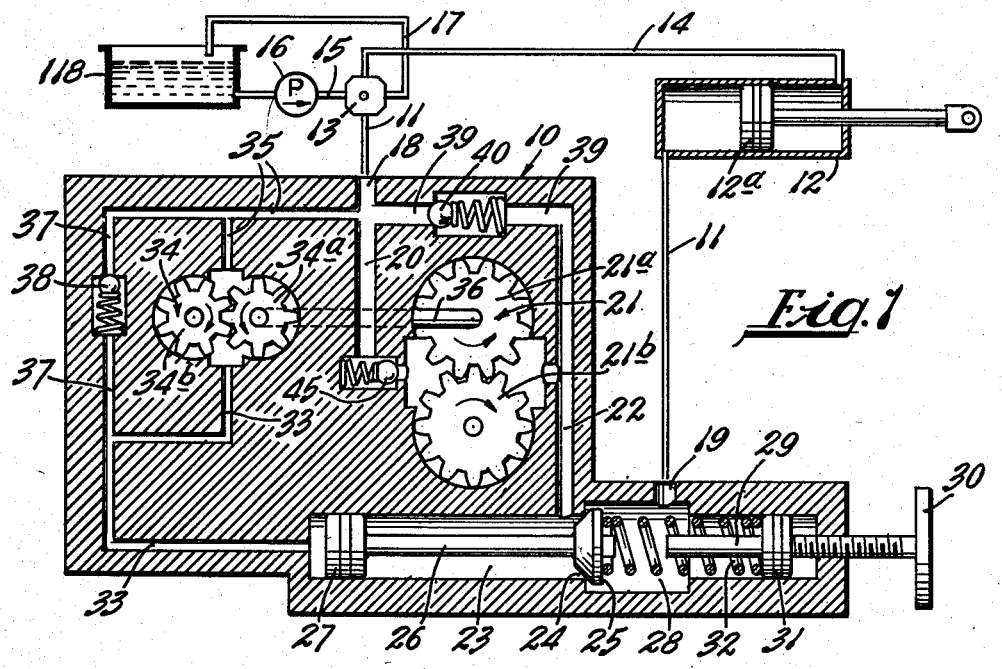
Fig. 1 is a schematic diagram showing one embodiment of the invention.

Referring first to Fig. 1, a valve 10 in accordance with the invention is shown connected in one of the lines 11 extending between one end of a hydraulic motor cylinder 12 and the usual 4-way control or selector valve 13, which is manually operated to cause the piston 12a of the motor cylinder 12 to move in either direction. The other end of the motor cylinder 12 is connected by a line 14 to the 4-way valve 13, and the latter is connected by a supply line 15 to a pump 16 and by an exhaust line 17 to a reservoir 118. As is well known, the 4-way valve 13 may be moved between a position in which both the lines 11 and 14 are blocked, to maintain the motor piston 12a stationary, into a position in which the pressure line 15 is connected to the line 11, and the exhaust line 17 is connected to the line 14, for moving the piston 12a to the right, or into another position in which the pump line 15 is connected to the line 14, and the exhaust line 17 is connected to the line 11 for moving the motor piston 12a to the left.

There are many applications in which it is desirable to automatically limit the stroke of the motor piston 12a. The valve 10 is provided for this purpose, and it functions to block the line 11 during leftward movement of the piston 12a to stop the latter after a predetermined quantity of fluid has flowed from the left end of the motor cylinder 12 through the line 11 and the valve 10.

The valve 10 has only two external ports, namely a first port 18 connected to that section of the line 11 leading to the control valve 13, and a second port 19 connected to that section of the line 11 leading to the left end of the motor cylinder 12. The first port 18 is connected by a passage 20 to one side of a gear motor 21, the other side of which is connected by a passage 22 to a cylinder 23 near the right end thereof. The right end of this cylinder constitutes a valve seat 24 cooperating with a poppet valve 25 that is connected by a rod 26 to a piston 27 movable in the cylinder 23. The cylinder 23 is communicated at its right end, by the valve seat, with a chamber 28 that is at all times connected to the second port 19. An adjustable stop rod 29 for limiting the rightward movement of the poppet 25 is threaded through the wall of the body and provided with a handle 30 on its outer end. A sealing piston 31 on the rod 29 prevents leakage of fluid therepast. A helical compression spring 32 may be provided between the seal 31 and the poppet 25 to urge the poppet and the piston 27 to the left, but this is not essential.

The left end of the cylinder 23 is communicated by a passage 33 with one side of a gear pump 34, the other side of which is connected by a passage 35 to the first port 18. The gear pump 34 is shown as comprising two gears 34a and 34b respectively, and the gear 34a is coupled by a shaft 36 to one of the gears 21a of the gear motor 21.

The gear pump 34 is bypassed by a passage 37 containing a check valve 38 for permitting flow past the gear pump 34 from the first port 18 while preventing reverse flow. Likewise, the gear motor 21 is bypassed by a passage 39 containing a check valve 40 which permits flow past the gear motor from the first port 18 while preventing reverse flow. For a purpose that will be explained in connection with the operation of the device, the check valve 40 is urged into closed position by a spring of appreciable strength so that it functions as a light relief valve to prevent flow from the first port 18 past the gear motor 21 until the pressure in the port 18 has risen to an appreciable value. On the other hand, the valve 38 is provided only as a check valve to prevent reverse flow and its spring is so light as to be overcome by a very light pressure substantially less than that required to open the valve 40.

The system of Fig. 1 functions as follows: The valve is shown in position in which the motor piston 12a has been stopped during leftward movement by closure of the poppet 25 against the seat 24, which blocks the line 11.

When it is desired to move the motor piston 12a to the right, the 4-way control valve 13 is manipulated to connect the pump output line 15 with the line 11, and connect the exhaust line 17 with the line 14. Pressure fluid thereupon enters the first port 18 of the valve 10 and flows through the passages 35 and 37 past the check valve 38 and into the left end of the cylinder 23, moving the piston 27 to the right in so doing and opening the poppet 25 until the latter abuts against the stop rod 29. During this initial phase of the operation, fluid does not flow through the gear pump 34 or through the gear motor 21, because the resistance to movement of those elements is greater than the resistance afforded by the check valve 38 and the piston 27. Likewise, it does not flow through the passage 39 because the resistance of the check valve 40 is sufficient to prevent such flow. However, after movement of the piston 27 has been terminated by contacting the stop 29, the flow of fluid through the passage 37 and the passage 33 is blocked, and the pressure then rises to a value sufficient to open the check valve 40 and permit the fluid to flow through the passage 39 and through the open valve seat 24 into the chamber 28, and through the second port 19 to the left end of the motor cylinder 12, moving the piston 12a therein to the right. This movement continues until either the piston 12a reaches the right end of its stroke or until the control valve 13 is restored to neutral. In most instances the motion is continued until the piston 12a reaches the right end of its stroke.

When next the control valve 13 is manipulated to supply pressure fluid to the line 14 and connect the line 11 to exhaust, the fluid flows through the line 14 into the right end of the cylinder 12, moving the piston 12a therein to the left and exhausting the fluid through the line 11 into the second port 19 of the valve 10. This fluid flows through the chamber 28 and through the open valve seat 24, and into the passage 22. The fluid is blocked from flowing through the passage 39 by the check valve 40 so that it must flow through the gear motor 21, rotating the latter in so doing. The fluid after passing through the gear motor flows through the passage 20 to the first port 18, and thence back to the control valve 13. The gear motor 21 rotates at speed proportional to the flow of fluid therethrough, and therefore proportional to the movement of the motor piston 12a, and it drives the gear motor 34 at a speed proportional to the movement of the motor piston. The gear motor 34 therefore pumps fluid from the left end of the cylinder 23 through the passage 33 back to the first port 18 at a rate proportional to the movement of the motor piston 12a. During this time, the pressure of the fluid entering the second port 19 is applied through the cylinder 23 to the right end of the piston 27 urging the latter to the left, and it moves leftward as fast as the fluid in the left end of the cylinder is exhausted therefrom by the gear pump 34. Hence when the motor piston 12a has traveled a predetermined distance to the left, the poppet 25 closes against the seat 24, positively blocking any further flow of fluid through the line 11, and stopping the motor piston 12a in a position determined by the amount of fluid that is required to move the poppet 25 from its rightmost position against the stop 29 into its leftmost position against the seat 24. This completes a cycle of operation.

A check valve 45 is shown between the passage 20 and the gear motor 21 to positively prevent flow of the fluid from the first port 18 through the motor 21. However, ordinarily the resistance to motion of the gear motor is sufficiently great to prevent such flow, and the check valve 45 can be dispensed with.

The gear motor 21 is preferably of much larger capacity than the gear pump 34. Hence the amount of fluid displaced by the piston 27 can be a very small fraction of the total volume of fluid flowing through the gear motor 21. This makes it possible for the cylinder 23 and the piston 27 to be relatively small and compact. Furthermore, since when pressure fluid is supplied to the first port 18 to move the piston 12a to the right, all of the fluid initially flows past the check valve 38 into the left end of the cylinder 23, this cylinder is filled very rapidly, and the piston 27 is moved through its full stroke into contact with the stop 29 before the motor piston 12a has traveled any appreciable distance. This insures positive resetting of the valve 25 against the stop 29 on each operation. Furthermore, it permits the operator, if he so desires, to move the motor piston 12a a further distance to the left by admitting pressure fluid into the line 11 just long enough to restore the piston 27 into its rightmost position (which operation moves the motor piston 12a hardly at all) and then immediately reversing the valve 13 to again supply pressure fluid to the line 14. The motor piston 12a then moves a further distance to the left equal to its normal movement from the right end of its stroke, because the movement of the piston 27 will again meter the normal amount of fluid.

Obviously the position in which the piston 12a is normally stopped may be varied between wide limits by adjusting the stop 29.

As has been previously indicated, the spring 32 urging the piston 27 to the left is not always necessary. Ordinarily, the resistance to rotation of the gear motor 21 will develop sufficient back pressure in the cylinder 23 to insure movement of the piston 27 to the left as fast as fluid is pumped from the left end of the cylinder by the gear pump 34. However, by providing additional force on the piston 27 by means of the spring 32, its operation can be made more positive, particularly if the frictional resistance to movement of the piston 27 in the cylinder 23 is unusually large. In this connection, it should be borne in mind that the cross-sectional area of the piston 27 is usually very small and the force thereon resulting from pressure of fluid in the cylinder 23 may be small compared to the frictional resistance to movement.

Instead of relying upon the spring 32 and upon the pressure of fluid in the cylinder 23 to move the piston 27 to the left, the fluid exhausted from the left end of cylinder 23 by the gear pump 34 can be used to positively force the piston 27 to the left. An arrangement whereby this is accomplished is shown in Fig. 2.

Figure 2:
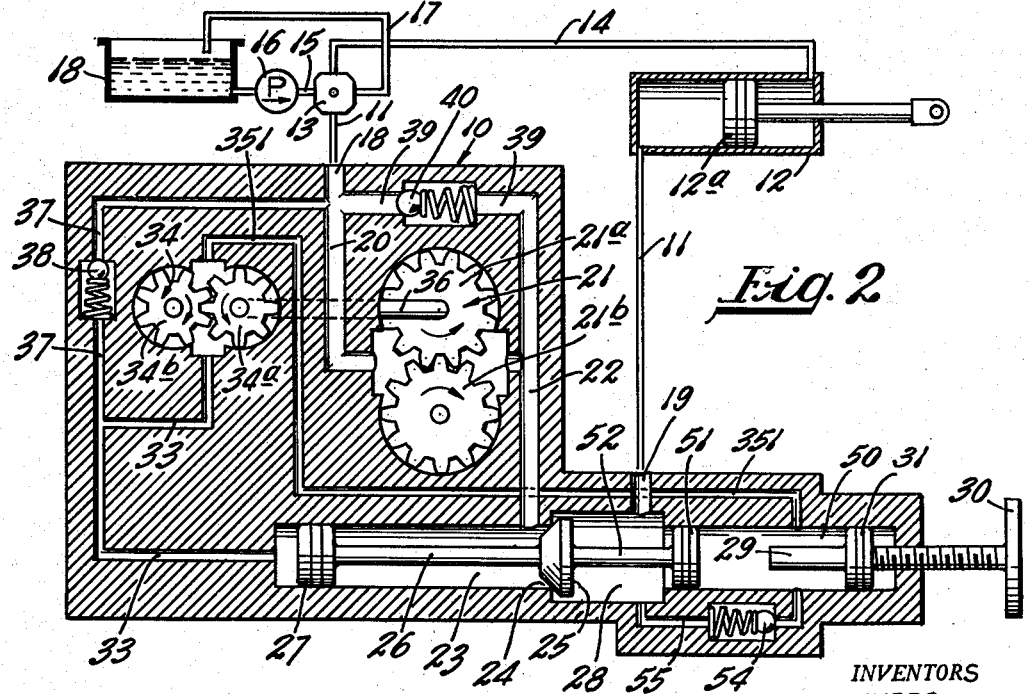
Fig. 2 is a schematic diagram showing a modification of the valve shown in Fig. 1.

In Fig. 2, the general arrangement is the same as in Fig. 1 and the corresponding parts bear the same reference numerals. However, whereas in Fig. 1 the passage 35 from the upper side of the gear pump 34 communicates with the first port 18, in Fig. 2 the corresponding passage 35I communicates with an auxiliary cylinder 50 that is formed as an extension of the chamber 28, and an auxiliary piston 51 in the cylinder 50 is connected to the valve 25 by a piston rod 52. Hence, in Fig. 2, the fluid pumped from the left end of the cylinder 23 by the gear pump 34 is delivered to the cylinder 50 where it acts against the piston 51 to positively move the assembly consisting of the piston 27, the valve 25 and the piston 51 to the left. During operation of the motor 12 in the opposite direction (rightward), the gear pump does not rotate, and hence a check valve 54 is provided in a passage 55 connecting the right end of the cylinder 50 with the chamber 28, so that during rightward movement of the piston 51 fluid can exhaust freely past the check valve 54 into the chamber 28.

Since the valve 10 has only hydraulic connection to the rest of the piston, and no mechanical connection, it can be placed wherever it is most convenient. This is usually closely adjacent the main control valve 13, whereas the motor cylinder 12 may be at a remote point. Most stroke-limiting valves rely upon mechanical connection to the piston 12a of the motor, and for that reason either must be placed in close proximity to the motor or connected thereto by some form of lengthy mechanical linkage.

Although for the purpose of explaining the invention a particular embodiment thereof has been shown and described, obvious modifications will occur to a person skilled in the art, and we do not desire to be limited to the exact details shown and described.

We claim:

1. A valve of the type described comprising a body having: first and second line ports; a cylinder containing a piston reciprocable therein; first passage means including a pump connected to one end of said cylinder; a fluid motor mechanically coupled to said pump for driving it, and second passage means connecting said motor between said first port and the other end of said cylinder; valve means connecting said other end of said cylinder to said second port; means mechanically coupling said piston to said valve means for closing said valve means in response to movement of said piston into said one end of said cylinder and opening said valve in all other positions; said motor being so sensed with respect to said pump that fluid flow from said second port through said valve means and said motor to said first port actuates said pump in direction to deliver fluid from said one end of said cylinder.

2. A valve according to claim 1 in which said motor has substantially larger volumetric capacity than said pump, and the volumetric capacity of said cylinder is small relative to the total volume of fluid flow through said motor required to actuate said piston through its stroke.

3. A valve according to claim 1 in which said pump is a gear pump and said motor is a gear motor.

4. A valve according to claim 1 including third passage means connecting said first port with said one end of said cylinder, and a fourth passage means connecting said first port with said other end of said cylinder, and a check valve in each of said third and fourth passage means for preventing flow therethrough from said cylinder to said first port while permitting flow in the opposite direction, the check valve in said third passage opening in response to a lower pressure in said first port than the check valve in said fourth passage, whereby fluid entering said first port first flows through said third passage into said one end of said cylinder, to move said piston away from the said one end to the limit of travel, and thereafter flows through said fourth passage.

5. A valve according to claim 1, including adjustable stop means for variably limiting the stroke of said piston away from said one end of said cylinder.

6. A valve of the type described comprising a body having: first and second line ports; a cylinder containing a piston reciprocable therein; first passage means including a pump connected between one end of said cylinder and said first port for controlling fluid flow from said cylinder; a fluid motor mechanically coupled to said pump for driving it, and second passage means connecting said motor between said first port and the other end of said cylinder; valve means connecting said other end of said cylinder to said second port; means mechanically coupling said piston to said valve means for closing said valve means in response to movement of said piston into said one end of said cylinder, and opening said valve in all other positions, said motor being so sensed with respect to said pump that fluid flow from said second port through said valve means and said motor to said first port actuates said pump in direction to deliver fluid from said one end of said cylinder to said first port.

7. A valve of the type described comprising a body having: first and second line ports; cylinder means containing piston means reciprocable therein; said piston means having two opposed pressure faces facing opposite ends of said cylinder means respectively; first passage means including a pump interconnecting opposite ends of said cylinder means for controlling fluid flow from one end of said cylinder; a fluid motor mechanically connected to said pump for driving it, and second passage means connecting said motor between said first port and said second port; valve means in said second passage means between said motor and said second port; means mechanically coupling said piston means to said valve means for closing said valve means in response to movement of said piston means into said one end of said cylinder means, and opening said valve in all other positions; said motor being so sensed with respect to said pump that fluid flow from said second port through said valve means and said motor to said first port actuates said pump in direction to deliver fluid from said one end of said cylinder means into the other end thereof.

8. A valve according to claim 7 including a third passage connecting said first port to said one end of said cylinder, and containing a check valve directed to prevent flow from said cylinder to said first port; and a fourth passage connecting the other end of said cylinder to said second port having a check valve directed to prevent flow from said second port to said cylinder.

CARLOS B. LIVERS
ALVIN A. MEDDOCK.

No references cited.